W. P. Elliott,
Sewing Machine Caster.
No. 101,844. Patented Apr. 12, 1870.
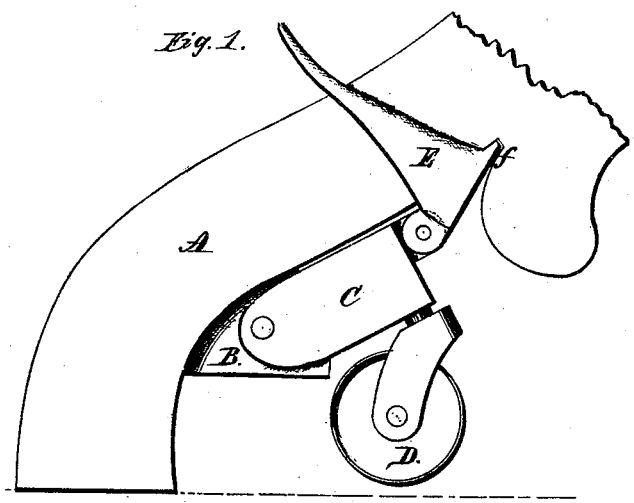
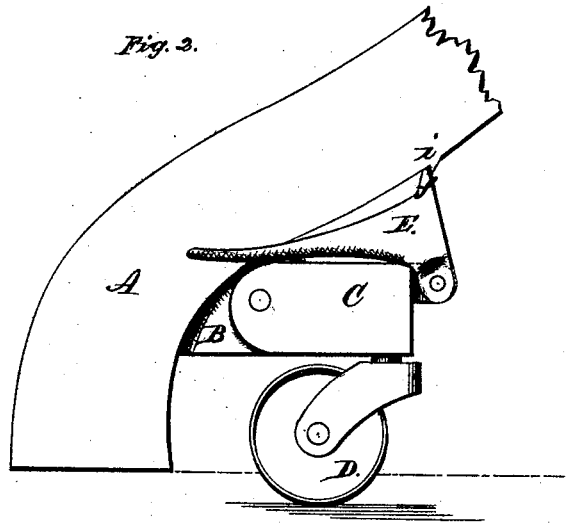
Witnesses
J. H. Shumway
A. J. Tibbits
W. P. Elliott
Assignor to Self & L. P. Goodyear
Inventor
By Atty,
John E. Earle

UNITED STATES PATENT OFFICE.

WILLIAM P. ELLIOTT, OF NEW HAVEN, CONNECTICUT, ASSIGNOR TO HIMSELF AND LEVERETT F. GOODYEAR, OF SAME PLACE.

IMPROVEMENT IN CASTERS FOR SEWING-MACHINES.

Specification forming part of Letters Patent No. 101,844, dated April 12, 1870.

*To all whom it may concern:*

Be it known that I, WILLIAM P. ELLIOTT, of New Haven, in the county of New Haven and State of Connecticut, have invented a new Improvement in Adjustable Casters for Sewing-Machines; and I do hereby declare the following, when taken in connection with the accompanying drawings and the letters of reference marked thereon, to be a full, clear, and exact description of the same, and which said drawings constitute part of this specification, and represent, in—

Figure 1, a side view of one of the legs with the caster raised; Fig. 2, a side view of the same with the caster dropped.

This invention relates to an improvement in the adjustment of casters for sewing-machines, so that the machine may be easily moved about, or the casters set so that the machine will stand solidly upon its legs; and the invention consists in hinging, as fully hereinafter described, the caster-wheel to the leg of the machine so that it may be thrown up and allow the leg itself to lie directly upon the floor, or turned down so as to take the weight of the machine.

A is one leg of the machine, upon which is formed a projection, B, to which, at $a$, a lever, C, is jointed, and to which said lever a caster-wheel, D, is attached, so that the lever, when raised, as seen in Fig. 1, takes the caster from the floor and permits the leg to rest solidly upon the floor; or when thrown down, as in Fig. 2, the leg is raised from the floor and the caster takes the weight. To thus operate the lever C a pawl, E, is pivoted to the lever C at $d$, so that from the position in Fig. 1 pressing down the pawl E forces down the lever C until a jaw, $f$, upon the pawl E falls below the projection $i$ on the leg, (see Fig. 2,) which said projection will hold the lever and support the leg raised, as in Fig. 2; or, the better way, simply raise the table and the caster will, by its own gravity, fall and the pawl automatically drop beneath the stop, thus making the adjustment of the caster automatic so far as its operation is concerned. Therefore when necessary to move the machine raise the leg, (or lower the caster,) as denoted in Fig. 2, and the machine resting upon the caster is easily moved; but when not in use, and it is desired that the machine should stand solidly, throw the lever E from the projection $i$, and the caster will be raised and the leg rest upon the floor, as in Fig. 1. The same caster may be applied to the other leg of the machine; or a common caster may be applied to that leg, if desired. In some cases the arrangement of a caster upon either the rear or front legs of the machine may be all sufficient.

I do not wish to be understood as broadly claiming the arrangement of a caster so as to be adjusted to entirely support the machine or to allow the machine to rest solidly on the legs, as the case may be.

I claim as my invention—

The arrangement of the lever C, with its caster D, upon the legs of a sewing-machine, when the said lever C is provided with a pawl, E, so as to automatically lock the caster in its down position, substantially as described.

WILLIAM P. ELLIOTT.

Witnesses:
   A. J. TIBBITS,
   J. H. SHUMWAY.